United States Patent

Brown

[15] 3,704,841

[45] Dec. 5, 1972

[54] MAGNETIC TAPE CARTRIDGE

[72] Inventor: Keith S. Brown, Cupertino, Calif.

[73] Assignee: Memorex Corporation, Santa Clara, Calif.

[22] Filed: Jan. 28, 1971

[21] Appl. No.: 110,403

[52] U.S. Cl. ..................242/199, 274/4 C, 274/11 C

[51] Int. Cl. ......G03b 1/04, G11b 15/32, G11b 23/04

[58] Field of Search..............................242/197–200; 274/4 B, 4 C, 11 B, 11 C; 352/72–78; 18/1; 264/349; 73/88, 89

[56] References Cited

UNITED STATES PATENTS

| | | | |
|---|---|---|---|
| 3,565,367 | 2/1971 | Yamamoto | 242/199 |
| 1,871,236 | 8/1932 | Proctor | 242/199 |
| 2,889,964 | 6/1959 | Cooprider | 222/321 |
| 3,413,021 | 11/1968 | Potts | 285/319 |

*Primary Examiner*—Leonard D. Christian
*Attorney*—Limbach, Limbach & Sutton

[57] ABSTRACT

An improved tape cartridge of moulded plastic having opposing tape reel viewing windows with internally projecting annular ridges fabricated around the periphery of spindle holes in the windows, the annular ridges being fabricated with relief slots for eliminating cracking of the windows during use.

4 Claims, 3 Drawing Figures

PATENTED DEC 5 1972 3,704,841

INVENTOR
KEITH S. BROWN
BY
Limbach, Limbach & Sutton
ATTORNEYS

MAGNETIC TAPE CARTRIDGE

BACKGROUND OF THE INVENTION

Tape cartridges for sound reproduction and information storage have increased in use phenomenally in recent years. Tape cartridges are a desirable means for storing a limited amount of magnetic tape for information recording and retrieval purposes. The cartridges are convenient to use, compact, and eliminate the often complicated tape threading and handling required with single reel storage. In a single unit the cartridge contains both the unwind and take-up reels. The unit is simply inserted in a cartridge type tape recorder for recording or replaying.

SUMMARY OF THE INVENTION

Tape cartridges have been improved by providing viewing windows in the sides of the cartridge units. The windows allow a viewer to examine the tape reels to determine the progress of the tape, or to insure that the tape is fully wound on the proper reel before starting, or for any like purpose requiring visual inspection of the reels. However, when spindle holes for the tape reels are fabricated in the plastic windows, and internally projecting annular ridges are fabricated around the periphery of the spindle holes to support the hubs of the rotating tape reels, the plastic windows have a tendency to crack along lines radiating from the high stress areas of the ridges. In order to alleviate ridge rigidity, relief slots are fabricated in the ridges, allowing a degree of flexibility to the plastic around the annular ridges. Preferably, two relief slots are fabricated on each annular ridge. The slots are positioned opposite one another along the common centerline of the spindle holes for the two reels.

DETAILED DESCRIPTION OF THE INVENTION

Figure 1:
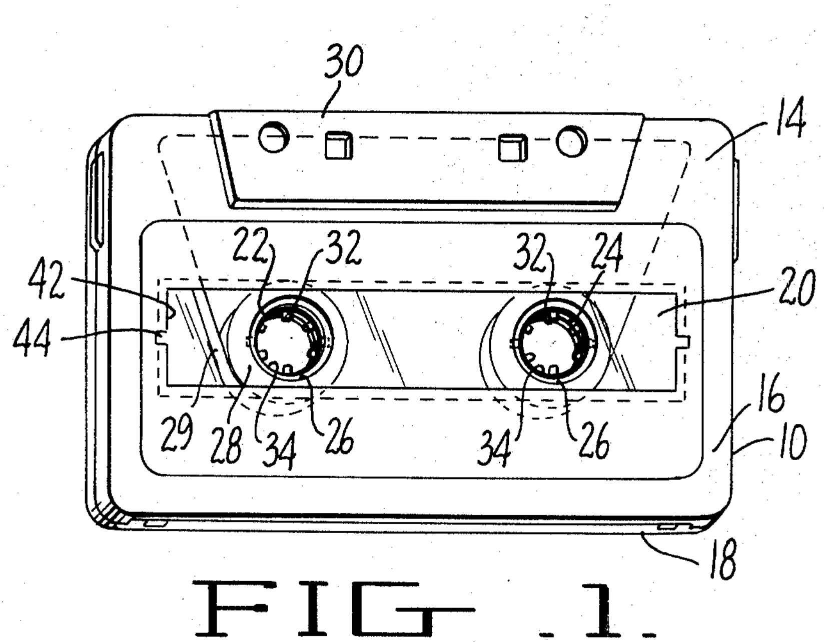
FIG. 1 is a perspective view of an assembled tape cartridge unit.

FIG. 1 illustrates a cartridge unit 10 for storage of magnetic tape and the like having a split molded plastic outer casing 14. The casing 14 is comprised of a front section 16 and a back section 18 which are snapped together and sealed during assembly of the cartridge unit elements. The assembled cartridge unit is provided with a pair of viewing windows 20 fabricated of a clear plastic material which permits viewing of two tape reels 22 and 24, respectively, contained within the casing.

The tape reels comprise a plastic hub 26 on which is would a supply of magnetic tape 28. A tape 29 is alternatively unwound from one reel, in this instance reel 22, threaded across the top edge 30 of the cartridge unit where it is exposed to a read-record head of a tape recorder (not shown) and wound on the second reel 24.

The hub 26 of each tape reel is formed with a splined core 32 which is accessible through opposing holes 34 in the window 20. During operation of the cartridge unit, drive spindles (not shown) engage the splined core 32 through the window holes, rotating the tape reels and moving the tape across the read-record heads of the tape recorder. To support the hubs 26 within the casing 14 in concentric alignment with the holes 34, opposing annular ridges 36 are provided around the edge of each hole on the inside face of the windows as most clearly shown in FIG. 3. The ridges engage an annular shoulder (not visible) adjacent the splined core 32 on each side of the hubs 26. The tape reels are thus sandwiched between the windows and the front and back sections, 16 and 18, of the casing 14 and free to rotate therebetween. The walls of the window and casing sections form guides for the tape as it is wound on the hubs.

Figures 2, 3:
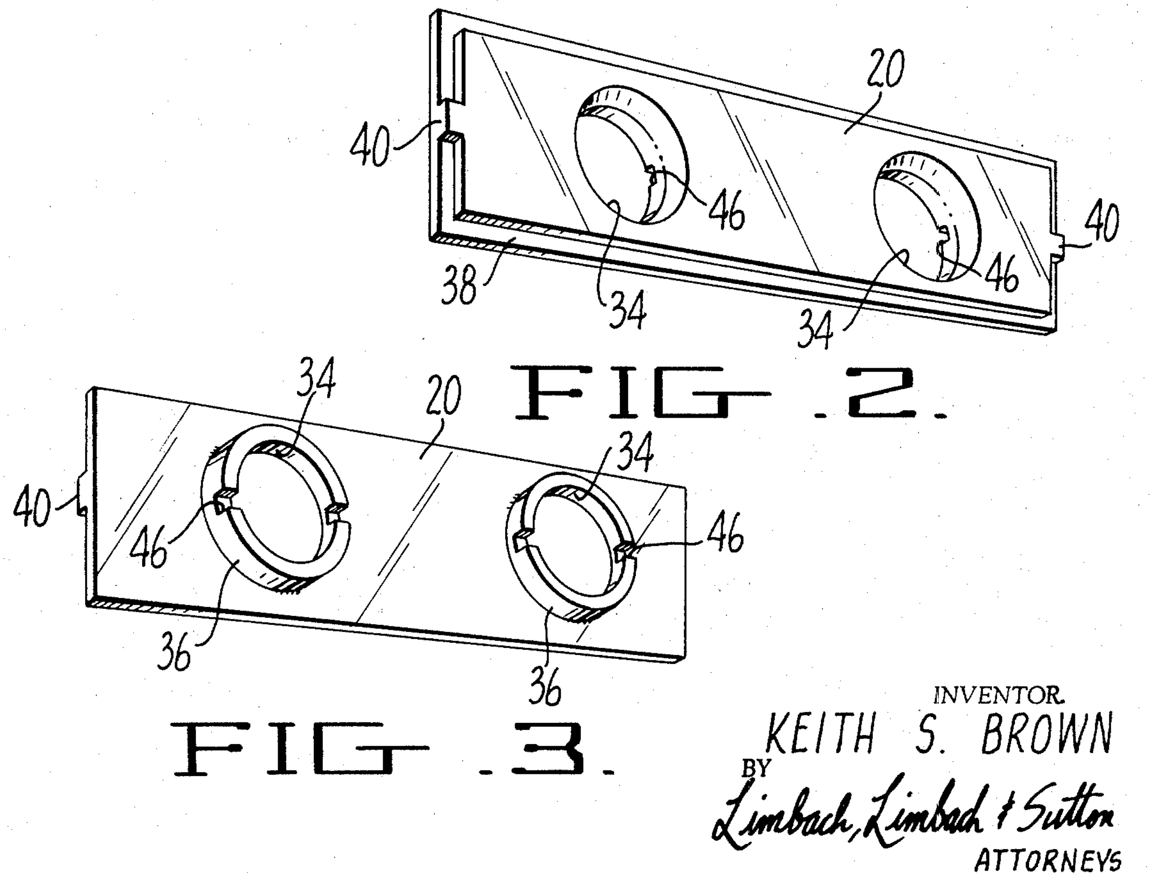
FIG. 2 is a perspective view of the outer face of the tape-reel window in FIG. 1.
FIG. 3 is a perspective view of the inner face of the tape-reel window of FIG. 1.

Turning to FIG. 2, the windows are fabricated with a stepped edge 38 having a small alignment tab 40 at each end. The stepped edge and tab 40 of the windows engage a matching edge 42 and keyway 44 on the inside of the front and back sections of the casing such that the windows are flush with the face of the casing when secured.

To prevent cracking of the windows, relief slots 46 are provided in each of the annular ridges. For most effective results, a pair of opposed slots are fabricated in each of the annular ridges in alignment with the mutual centerline of the pair of holes on each window. The relief slots need be cut only to a depth about two-thirds of the windows during even abusive handling of the cartridge unit.

I claim:

1. An improved magnetic tape cartridge having at least one viewing window with internally projecting annular ridges fabricated around the periphery of tape-reel spindle holes in the window wherein the annular ridges are fabricated with at least one relief slot for eliminating cracking of the window.

2. An improved magnetic tape cartridge having opposed tape reel viewing windows with internally projecting annular ridges around the periphery of the two tape-reel spindle holes in each window, wherein the annular ridges are each fabricated with pairs of relief slots for eliminating cracking of the window.

3. The tape cartridge of claim 2 wherein the pairs of relief slots are aligned along the mutual centerline of the tape-reel spindle holes on each window.

4. The tape cartridge of claim 3 wherein the relief slots are cut to a depth two-thirds the height of the ridges.

* * * * *